United States Patent
Chundru et al.

(10) Patent No.: US 12,247,508 B2
(45) Date of Patent: Mar. 11, 2025

(54) SYSTEM AND METHOD FOR REDUCED NITROUS OXIDE EMISSIONS USING PREDICTIVE UREA DOSING CONTROL

(71) Applicant: Southwest Research Institute, San Antonio, TX (US)

(72) Inventors: Venkata R. Chundru, San Antonio, TX (US); Sankar B. Rengarajan, San Antonio, TX (US); Jayant V. Sarlashkar, San Antonio, TX (US); Scott Hotz, Pinckney, MI (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 24 days.

(21) Appl. No.: 17/661,863

(22) Filed: May 3, 2022

(65) Prior Publication Data
US 2023/0358157 A1   Nov. 9, 2023

(51) Int. Cl.
 *F01N 3/20* (2006.01)
 *F01N 3/035* (2006.01)
 *G01C 21/34* (2006.01)
 *H04W 4/40* (2018.01)

(52) U.S. Cl.
 CPC ............. *F01N 3/208* (2013.01); *F01N 3/035* (2013.01); *G01C 21/3469* (2013.01); *F01N 2610/02* (2013.01); *F01N 2610/146* (2013.01); *F01N 2900/0402* (2013.01); *F01N 2900/08* (2013.01); *F01N 2900/10* (2013.01); *F01N 2900/1402* (2013.01); *F01N 2900/1404* (2013.01); *F01N 2900/1411* (2013.01); *H04W 4/40* (2018.02)

(58) Field of Classification Search
 CPC ...... F01N 3/208; F01N 3/035; F01N 2610/02; F01N 2610/146; F01N 2900/08; F01N 2900/1402; F01N 2900/1411; F01N 2900/10; F01N 2900/0402; F01N 2900/102; F01N 2900/12; F01N 2900/1404; F01N 9/00; G01C 21/3469; H04W 4/40; Y02A 50/20; Y02A 10/12
 See application file for complete search history.

(56) References Cited

U.S. PATENT DOCUMENTS

| | | | |
|---|---|---|---|
| 2002/0194841 A1* | 12/2002 | Genderen | ........... F01N 9/005 60/300 |
| 2017/0030243 A1* | 2/2017 | Li | ............ F01N 9/007 |
| 2020/0063632 A1* | 2/2020 | Hendrickson | ......... F01N 3/2066 |

\* cited by examiner

*Primary Examiner* — Phutthiwat Wongwian
*Assistant Examiner* — Diem T Tran
(74) *Attorney, Agent, or Firm* — Grossman, Tucker, Perreault & Pfleger, PLLC

(57) ABSTRACT

In an approach to reduce nitrous oxide emissions using predictive urea dosing control, a route is determined. A set of target coverage fractions of ammonia is determined over a set of steps for the route, where the coverage fraction of ammonia is a ratio of stored ammonia to a maximum storage capacity of ammonia in a selective catalytic reduction (SCR) device. An actual coverage fraction of ammonia is determined for each step of the route. The actual coverage fraction of ammonia is compared to the target coverage fraction of ammonia for each step. The urea injection rate is adjusted based on a cost function.

13 Claims, 10 Drawing Sheets

SYSTEM AND METHOD FOR REDUCED NITROUS OXIDE EMISSIONS USING PREDICTIVE UREA DOSING CONTROL

FIELD

The present application relates generally to diesel engine emissions and, more particularly, to a system and method for reduced nitrous oxide emissions using predictive urea dosing control.

BACKGROUND

Diesel engines, which have major roles in trucking applications, are energy efficient, but their NOx and particulate emissions present major obstacles. Diesel engines offer the possibility of combining very high thermal efficiencies with very low emissions, but the main problem areas are emissions of nitrogen oxides (NOx) and particulates. Very high temperatures in the combustion chamber help to reduce the emission of soot but produce higher levels of nitric oxide (NO). Lowering the peak temperatures in the combustion chamber reduces the amount of NO produced but increases the likelihood of soot formation.

Exposure to diesel exhaust can lead to serious health conditions like asthma and respiratory illnesses and can worsen existing heart and lung disease, especially in children and the elderly. These conditions can result in increased numbers of emergency room visits, hospital admissions, absences from work and school, and premature deaths. Emissions from diesel engines also contribute to the production of ground-level ozone which can damage crops, trees, and other vegetation. Diesel exhaust is also implicated in the production of acid rain, which affects soil, lakes, and streams, which can enter the human food chain via water, produce, meat and fish.

In the United States, federal emission standards for heavy-duty engines are set by the U.S. Environmental Protection Agency (EPA) and California standards are set by the California Air Resources Board (CARB). In the heavy-duty engine sector, the federal and California emission standards have historically been well aligned; the differences were relatively minor and, in most cases, temporary. However, the CARB low NOx emission standards are significantly more stringent than the current EPA emission requirements. Recently the EPA announced that it would pursue the Cleaner Trucks Initiative (CTI) to update NOx emissions standards for heavy-duty trucks.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

SUMMARY

In one illustrative embodiment, a system for reducing nitrous oxide emissions in an aftertreatment system comprises: one or more computer processors; one or more non-transitory computer readable storage media; and program instructions stored on the one or more non-transitory computer readable storage media for execution by at least one of the one or more computer processors. A route is determined. A set of target coverage fractions of ammonia is determined over a set of steps for the route, where the coverage fraction of ammonia is a ratio of stored ammonia to a maximum storage capacity of ammonia in a selective catalytic reduction (SCR) device. An actual coverage fraction of ammonia is determined for each step of the route. The actual coverage fraction of ammonia is compared to the target coverage fraction of ammonia for each step. The urea injection rate is adjusted based on a cost function.

In another illustrative embodiment, a route is determined. A set of target coverage fractions of ammonia is determined over a set of steps for the route. An actual coverage fraction of ammonia is determined for each step of the set of steps for the route. The actual coverage fraction of ammonia is compared to the target coverage fraction of ammonia for each step. The urea injection rate is adjusted based on a cost function.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
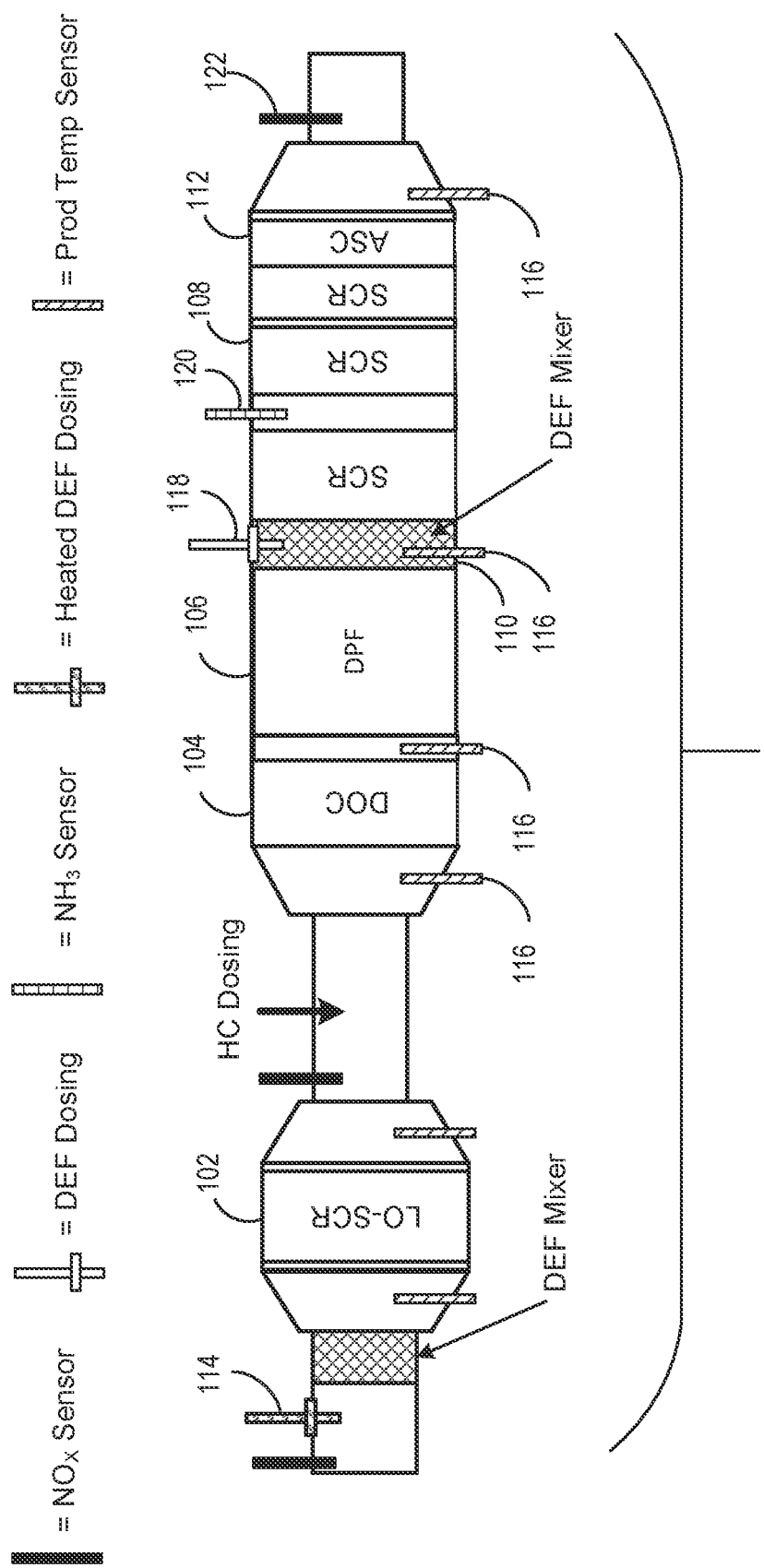
FIG. 1 is a functional block diagram illustrating a typical Diesel Aftertreatment (AT) system for low NOx emissions.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Diesel engines emit significant amount of particulate matter (PM) and nitric oxides (NOx) due to lean combustion. These pollutants are regulated by regulatory bodies such as the Environmental Protection Agency (EPA) and the California Air Resources Board (CARB) in the United States. To meet these standards, manufacturers are utilizing both engine and aftertreatment system control strategies for compression ignition (CI) combustion engines. Specifically, manufacturers are using engine controls such as cooled exhaust gas recirculation (EGR), variable geometry turbochargers, high pressure fuel injection, and other associated electronic controls, as well as aftertreatment system controls such as diesel oxidation catalyst (DOC), diesel particulate filter (DPF) and/or catalyzed particulate filter (CPF), urea-based SCR, urea injection control, and $NH_3$ slip catalysts (ASC).

FIG. 1 is a functional block diagram illustrating a typical diesel aftertreatment (AT) system for low NOx emissions. The CI engine aftertreatment system typically consists of a DOC 104, catalyzed DPF 106 (or CPF), one or more SCRs 108, including a light-off, or upstream, SCR (LO-SCR) 102, an ASC 112 to clean up the engine exhaust gases, and one or more sensors including, but not limited to, $NO_x$ sensor 122, one or more temperature sensors 116, and $NH_3$ sensor 120. A DOC uses precious metals such as palladium and platinum to promote oxidation of hydrocarbons (HC) and carbon monoxide (CO), to either reduce these pollutant emissions from the engine or to promote exothermic heat used for DPF regeneration and to oxidize nitric oxide (NO) to nitrogen dioxide ($NO_2$). $NO_2$ is used to promote passive soot DPF regeneration as well as to promote faster SCR catalytic reactions to reduce NOx.

To meet the current heavy-duty engine NOx standards, manufacturers are currently using SCR systems that utilize $NH_3$ as the reductant from a urea-based diesel exhaust fluid (DEF). In the SCR system, DEF is injected into the hot exhaust stream by DEF mixer 110, DEF dosing 118, and heated DEF dosing 114 to break down the NOx into simple nitrogen and water. The objective of a urea injection control system is to simultaneously minimize tailpipe NOx and $NH_3$ emissions by enabling the urea dosing system to inject the precise amount of urea necessary for NOx conversion.

An ASC is a precious metal-based oxidation catalyst that is used to oxidize excess unreacted $NH_3$ that may have slipped through the SCR catalyst and would otherwise be exhausted to the environment. ASCs are designed to have high selectivity for $NH_3$, oxidizing $NH_3$ to form nitrogen. However, if the NO to $NH_3$ ratio coming out of the SCR catalyst is very high, the catalyst may also catalyze undesirable reactions that produce $N_2O$, a potent greenhouse gas (GHG), or oxidize the $NH_3$ to produce NOx at the tailpipe.

Model-based feed-forward and feedback (closed-loop) DEF dosing controls with appropriate exhaust sensors are necessary in applications where high NOx conversion efficiency is needed. For a closed-loop SCR control system, a NOx sensor upstream and downstream of the SCR and mid-bed $NH_3$ sensors are needed to monitor the amount of $NH_3$ coverage on the SCR catalyst and adjust the amount of urea injected to reach the coverage design target. The SCR observer model receives input data consisting of exhaust gas temperature, flow rate and urea dosing rate. The model computes stored $NH_3$ based on inputs, and this quantity is used as a measured variable to determine the DEF dosing for the next step.

The chemical reactions that occur in a typical SCR include $NH_3$ adsorption (reaction between $NH_3$ in gas and a Copper-Xenon (Cu-Ze) catalyst); $NH_3$ desorption (reaction between stored $NH_3$ with exhaust); NO oxidation (NO and $O_2$ based reaction); $NH_3$ oxidation (oxidation of $NH_3$ with $O_2$); standard SCR reaction (SCR reaction between stored $NH_3$, $O_2$ and NO); fast SCR reaction (SCR reaction between stored $NH_3$, $NO_2$ and NO); and slow SCR reaction (SCR reaction between stored $NH_3$ and $NO_2$).

Current SCR systems provide high NOx conversion efficiencies during steady-state and high-speed operations where exhaust temperatures are high enough for the SCR system to function effectively. Despite meeting the current standards during certification test cycles, they have poor NOx conversion efficiency when exhaust gas temperatures are low, such as during cold start, low-speed, low-load driving and during extended idling. This is because SCR performance is limited by urea decomposition issues at exhaust gas temperatures below 180° C. If urea is injected at exhaust gas temperatures below 180° C., solid deposits of ammonium nitrate can form over the catalyst and exhaust system, resulting in degradation in SCR conversion efficiency and catalyst damage. As a result, SCR systems are not operated at low exhaust temperatures that prevail during low load operations. Unfortunately, these low load conditions dominate actual operation of heavy-duty vehicles in urban stop-and-go operation in communities and on congested freeways where the reduction of NOx is most needed.

Figure 2:
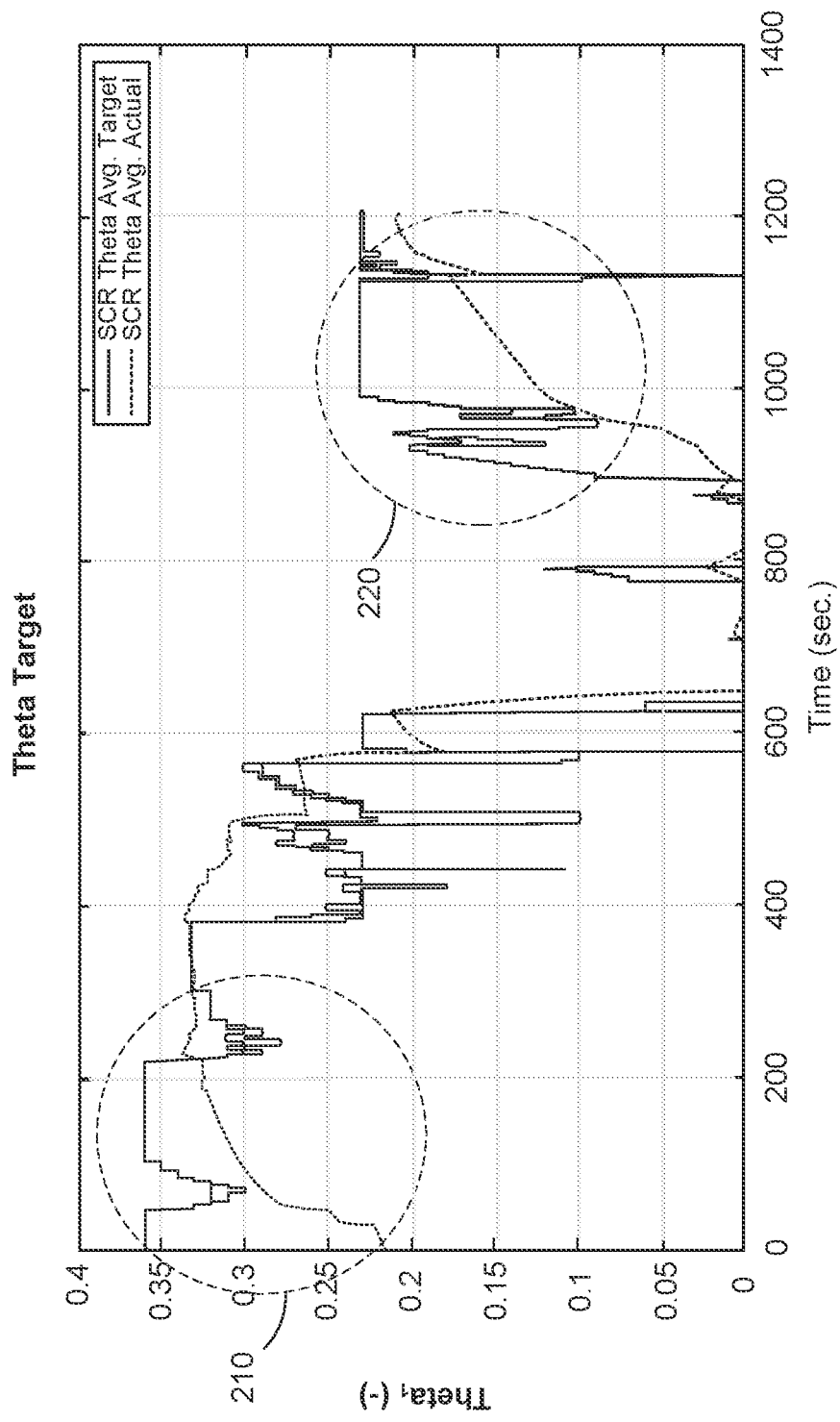
FIG. 2 is an example chart of the average target value of the coverage fraction of ammonia ($NH_3$) plotted with the average actual value of the coverage fraction of $NH_3$ in an SCR.

In addition, the $NH_3$ storage in an SCR is a slow-moving state, e.g., with a time constant of approximately 5-8 minutes depending on the operating condition of the engine, while the emissions, primarily consisting of NOx, and the temperature of exhaust gas change on a much shorter timescale, e.g., 1-2 seconds. This problem is illustrated in FIG. 2, which is an example chart of the target value of the coverage fraction of $NH_3$ (herein denoted as theta target or $\theta^T$) versus the actual value of the coverage fraction of $NH_3$ (herein denoted as theta or $\theta$) in an SCR. The coverage fraction of $NH_3$ in an SCR is defined as is the ratio of stored $NH_3$ to the maximum storage capacity of the SCR in mol/m³ targets for the controller in the prediction horizon. This chart illustrates the problem with current AT systems as explained above. In the example chart of FIG. 2, detail 210 and detail 220 illustrate areas of the plots where there is significant difference between $\theta^T$ and $\theta$. The delay observed in FIG. 2 is primarily due to two components. First, $\theta$ is a slow-moving state that can benefit from prior information about future theta targets. Second, exhaust conditions, such as flowrate and temperature, limit the urea flow injection. The delay associated with first factor can be reduced using the connected powertrain data. Future exhaust conditions can be estimated based on engine speed and load conditions. By using a predictive $\theta^T$ determined in advance, the present disclosure adjusts the urea injection rate to minimize the difference between $\theta^T$ and $\theta$.

Since the SCR can only store a certain amount of $NH_3$ as a function of temperature, there are two cases that need to be addressed. First, if $\theta$ is too large for an anticipated temperature increase, e.g., anticipated acceleration, upcoming incline, etc., then this will lead to a waste of $NH_3$, i.e., desorption. Second, if θ is too small for an anticipated temperature decrease, then there will be insufficient $NH_3$ to properly convert $NO_x$.

In order to enable the system to react to these rapid changes in input conditions, the system $NH_3$ storage needs to be prepared for future operation. To achieve this, the present disclosure is a predictive urea dosing control system for an SCR-based aftertreatment system based on predictions from connected powertrain data to achieve optimal control of θ during operation of the vehicle. The disclosure includes a model predictive controller that utilizes connected power train data to predict future temperature and NOx conditions and thus $θ^T$ and urea dosing targets.

Some of the features of the disclosed system include: leveraging θ targets to avoid excess storage during thermal waves and avoid low storage during predicted high NOx events by actively managing the urea injection rate; making use of information about discrete events such as predicted trip end time to dose excess urea to ensure optimal coverage fraction of $NH_3$ for the start of the next trip; resizing catalyst volume to take advantage of tighter theta coverage fraction of $NH_3$ control, i.e., reduction of downstream catalyst size if an LO-SCR is being used, for a significant amount of NOx reduction; and using active thermal management where the controller can request thermal management event from the engine if it perceives a limitation in system performance due to thermal constrains.

In one exemplary embodiment, the system disclosed herein determines a route for the desired trip using eco-routing (i.e., the identification of the most energy-efficient route for a vehicle to travel between two points). The trip is divided into time horizons, which may include both a set of short horizon steps and a set of long horizon s. A route energy profile is determined, and the system converts this into the required power demand, i.e., engine speed and load. Engine and DOC maps are used to estimate exhaust conditions for the route, and $θ^T$ is determined, e.g., from a lookup table (LUT), for each horizon of the trip. Long horizons are based on the eco-routing computed at the start of the trip. Long horizons may be, for example, 5 kilometers. Short horizons are chosen based on criteria such as, for example, a 10 second time window, or may be determined by the range of a Vehicle-to-Everything (V2X) communications network passing updated route information to the system, e.g., every 500 meters.

The long horizon length is chosen based on trip length. The long horizon data is computed at the start of a trip in the form of expected actual theta and target theta of the SCR which may be updated later based on the short horizon data obtained from V2X sources, e.g., DSRC. The information required for long horizon prediction may be obtained based on GPS and map data primarily consisting of traffic density, velocity forecasts and road gradient. In some embodiments, this length may be calibrated based on the application (e.g., highway versus city driving) and the SCR system design.

The theta targets for the entire route are precomputed at trip start time based on eco-routing data by discretizing each section, e.g., each 250 meters, as a unit. Those points that fall between the nodes of the short horizons are filled in by interpolation. In some embodiments, where V2X technology is in use by the system, this target value may be updated based on real time data from the V2X traffic data for the next short horizon of the route.

Figure 3:
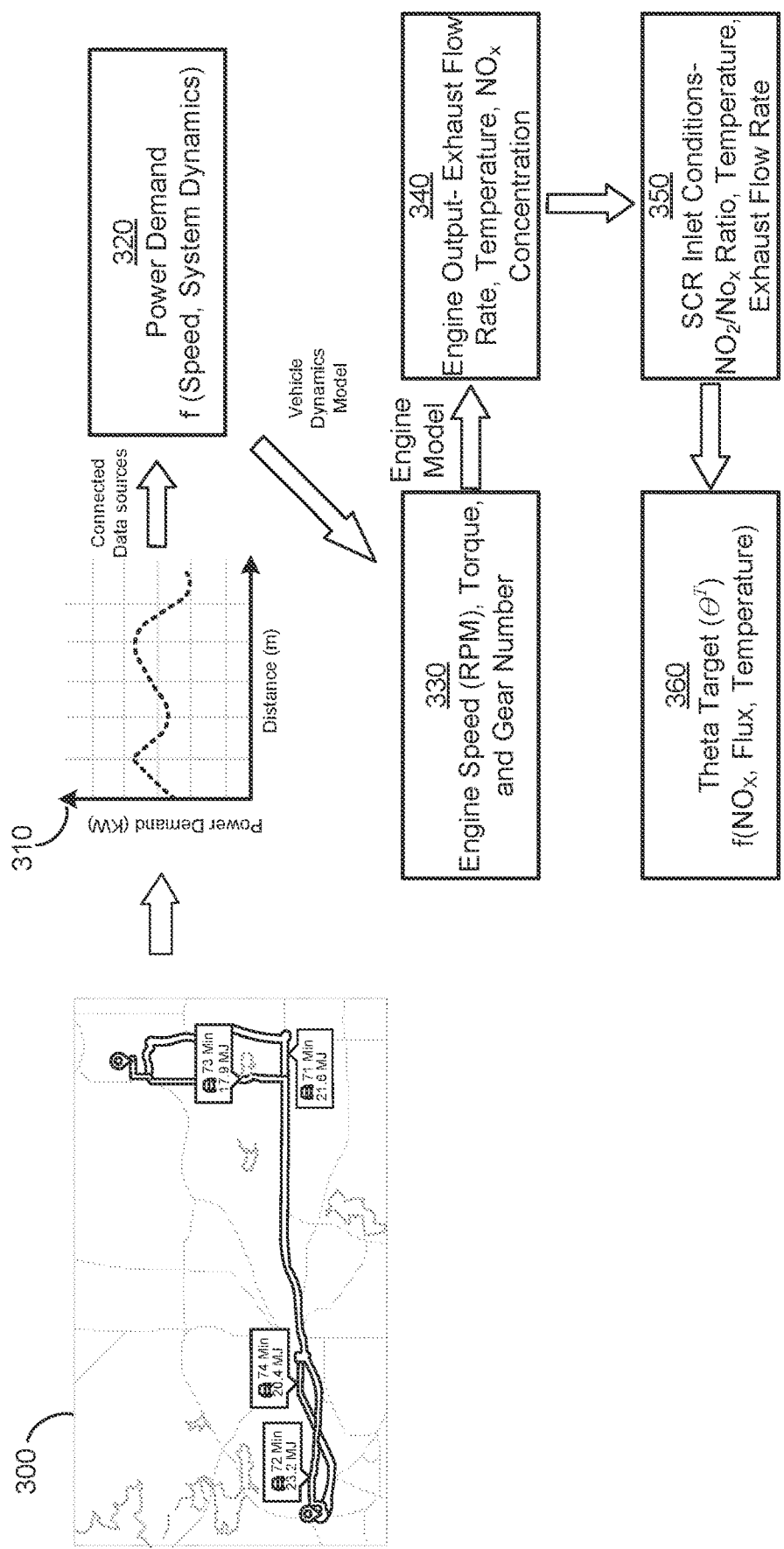
FIG. 3 is an illustration of the of the route planning and target coverage fraction of $NH_3$ calculation phase of the $NO_x$ reduction program, in accordance with an embodiment of the present disclosure.

FIG. 3 is an illustration of an algorithm for the route planning and $θ^T$ calculation phase of the $NO_x$ reduction program 612, in accordance with an embodiment of the present disclosure. The system uses the route data determined by model predictive control (MPC) to anticipate engine out temperature, flow rate and NOx conditions along the route. Step 300 illustrates the determination of the optimal route to take for the desired trip. Once the optimal route has been determined in step 300, the power demand curve is determined for the trip. An example of a power demand curve is illustrated in the chart 310. The power demand is determined for both the short horizons and the long horizons. In step 320, the power demand is determined for each horizon as a function of vehicle speed and system dynamics. This information is entered into a vehicle dynamics model for the specific vehicle. In some embodiments, the vehicle dynamics model may use connected data sources, e.g., route data received via V2X communications, in addition to the optimal route data to determine the power demand. In step 330, the vehicle dynamics model determines the engine speed in revolutions per minute (RPM), torque, and gear number for each horizon. These parameters are then entered into the engine model. In step 340, the engine model calculates the exhaust flow rate, temperature, and $NO_x$ concentration for each horizon. In step 350, the SCR inlet conditions are determined for each horizon. These inlet conditions include $NO_2/NO_x$ ratio, temperature, and exhaust flow rate. Finally, in step 360, $θ^T$ is determined as a function of the $NO_x$ flux and temperature.

Once the driver starts the trip, the system will leverage the long horizon plan for θ storage to set θ target boundary conditions in the short horizon. The short horizon window moves along the long horizon as the vehicle navigates through the route. The system compares the kinetic model-based θ estimates against $θ^T$ to determine the optimal DEF injection rate for both the upstream and downstream DEF injectors.

The control algorithm used by the system has three competing objectives that need to be met in the following order. First, the primary objective is to meet the >99.5% system NOx conversion target or maximum NOx conversion possible for given temperature, NOx concentration and exhaust flow rate conditions. Second if the first objective is met, then maximize the PM oxidation rate in the DPF/CPF; this is quantified in terms of maximizing the LO-SCR output NOx.

The third objective is to minimize the tailpipe $NH_3$ slip. There are two sub cases for this objective. First, minimize the $NH_3$ slip from both the LO-SCR and the downstream SCR, and second, allow some NOx slip from LO-SCR which improves performance of the catalyzed soot filter (CSF) by promoting soot oxidation. Any excess NOx can be reduced in the downstream SCR provided the catalyst is above the light-off temperature.

Equation 1 shows the cost function of this algorithm:

$$J = \left\{ \sum_{i=1}^{i=nu} \|θ_{Target,Final} - θ_{1,k+i}\|_2^2 + λ \sum_{i=0}^{i=nu-1} \|ΔC_{NH_3,k+i}\|_2^2 + \right. \quad (1)$$
$$\left. λ_2 \sum_{i=0}^{i=nu-1} \|ΔC_{NO_x,i,SCR\_in} - ΔC_{NO_x,i,SCR\_out}\|_2^2 \right\}$$

where: the first term $$\sum_{i=1}^{i=nu} \|θ_{Target,Final} - θ_{1,k+i}\|_2^2$$

is a control horizon cost that penalizes NH3 coverage deviation from target over the control horizon; the second term $$\lambda \sum_{i=0}^{i=nu-1} \|\Delta C_{NH_3,k+i}\|_2^2$$

represents the urea injection rate cost; and the third term $$\lambda_2 \sum_{i=0}^{i=nu-1} \|\Delta C_{NO_x,i,SCR\_in} - \Delta C_{NO_x,i,SCR\_out}\|_2^2$$

is the NOx maximizing cost at the CPF inlet. The difference between NOx inlet and outlet represents NOx conversion in the SCR which needs to be penalized to in the case of an LO-SCR. For the downstream SCR, this term is reduced to zero.

The control horizon is the time horizon upon which the actual dosing control signal from the algorithm is applied to the system (i.e., the urea doser). The short horizon is the time horizon used to compute the control command. In some embodiments, the control horizon is shorter than the short horizon. In one typical example, the long horizon represents the entire trip, and the short horizon is 500 meters, based on the typical range of V2X technology. The short horizon duration(s) is determined from the V2X technology range (e.g., 500 meters in this example) divided by the velocity of the vehicle (in meters per second), i.e., the short horizon duration(s)=V2X technology range (e.g., 500 m)/velocity of vehicle (m/s).

The system computes the predicted behavior of the SCR over the short horizon by combining the information from the long horizon and the short horizon data, and using the resultant prediction (i.e., predicted actual SCR storage) along with the storage target to compute the control signal (i.e., the urea dosing command) for the control horizon (e.g., a duration of 60 seconds). In some embodiments, the length of the control horizon may be adjusted based on the computational power of the system and the length of the control window. The short horizon window length may change based on range of the available V2X technology for a given application.

In Equation 1, nu=the current step time; ny=the last step of current short horizon; $\theta_{Target,Final}$=the target coverage fraction of $NH_3$ value obtained via long horizon optimization; $\theta_{1,i}$=the observed $NH_3$ coverage fraction; $\Delta C_{NH_3}$, $\Delta C_{NO_x,LO\ SCR\_in}$, $\Delta C_{NO_x,LO\ SCR\_out}$=the change in $NH_3$ inlet, $NO_x$ inlet, and outlet concentrations across the SCR; and $\lambda_1$, $\lambda_2$=weight factors.

The cost function has three objectives: first, to maximize the NOx conversion; second, to reduce the urea consumption, and third, to maximize the LO-SCR NOx for proper operation of the DPF. To meet the first objective, the urea dosing is increased; to meet the second objective, the urea dosing is reduced; and to meet the third objective, the urea dosing is further reduced. The resultant urea dosing obtained is a trade-off of the three objectives, which is used as a control signal for the urea doser.

The tradeoff between the first, second, and third objectives is controlled using a set of weights, where the NOx conversion has a weight of 1 since it is the primary objective of the system. The second objective, reducing the urea consumption, has a lower weight, $\lambda\_1$, compared to the NOx conversion due to the secondary nature of this objective. The third objective, maximizing the LO-SCR NOx for proper operation of the DPF, has the lowest weight, $\lambda\_2$, of the total weightage (e.g., less than 10%) since this objective needs to activate only when the first and second objectives are satisfied. The third objective only applies to the LO-SCR (i.e., the SCR upstream of the DOC), therefore for the downstream SCR (after the DOC DPF) $\lambda\_2=0$.

Figure 4:
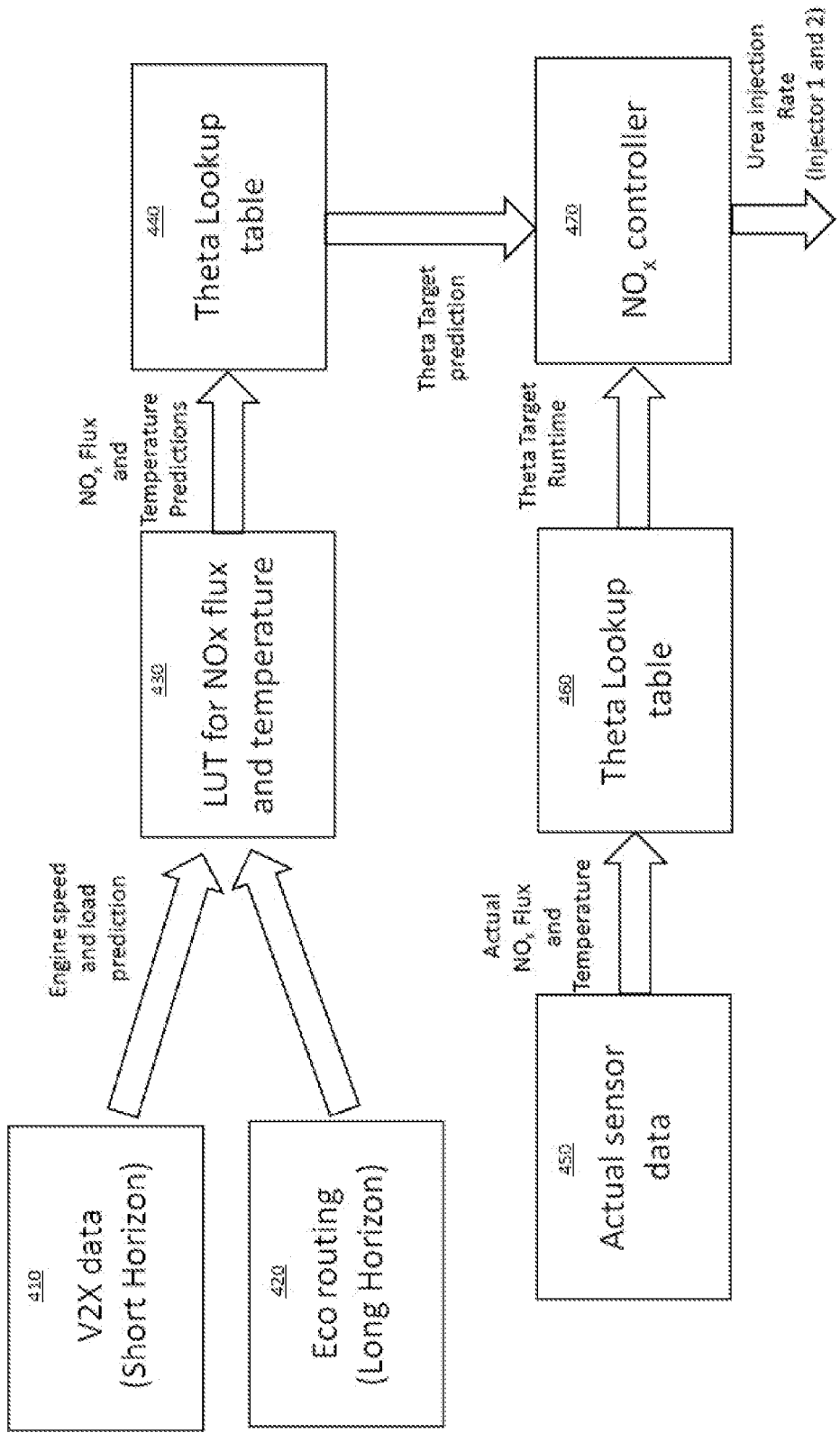
FIG. 4 is a block diagram of one possible architecture of the control flow for the $NO_x$ reduction program, in accordance with an embodiment of the present disclosure.

FIG. 4 is a block diagram of one possible architecture of the control flow for the $NO_x$ reduction program 612, in accordance with an embodiment of the present disclosure. In the block diagram of FIG. 4, block 410 is the short horizon data, e.g., data received via a V2X network, and block 420 is the long horizon data, e.g., the data determined from the optimal route, are received. From this data, engine speed and load predictions are input into block 430, where the $NO_x$ flux and temperature are predicted. In some embodiments, NOX flux and temperature are predicted from a LUT. In other embodiments, $NO_x$ flux and temperature are predicted by using AI. The predicted $NO_x$ flux and temperature are then input into block 440, where $\theta^T$ predictions are determined. In some embodiments, $\theta^T$ is predicted from a LUT. In other embodiments, $\theta^T$ is predicted by using AI. The $\theta^T$ predictions are then sent to block 470. In block 450, the actual sensor data from the various sensors in the vehicle are received, and the actual $NO_x$ flux and temperature are input into block 460. As in block 440 for the predicted $\theta^T$, in block 460 the actual $\theta$ is determined, e.g., from a LUT, based on the actual data from the sensors. The actual $\theta$ is input into block 470, where the actual $\theta$ is compared to $\theta^T$, and the $NO_x$ controller sets the urea injection rate for both the LO-SCR and the SCR based on these values.

Figure 5A:
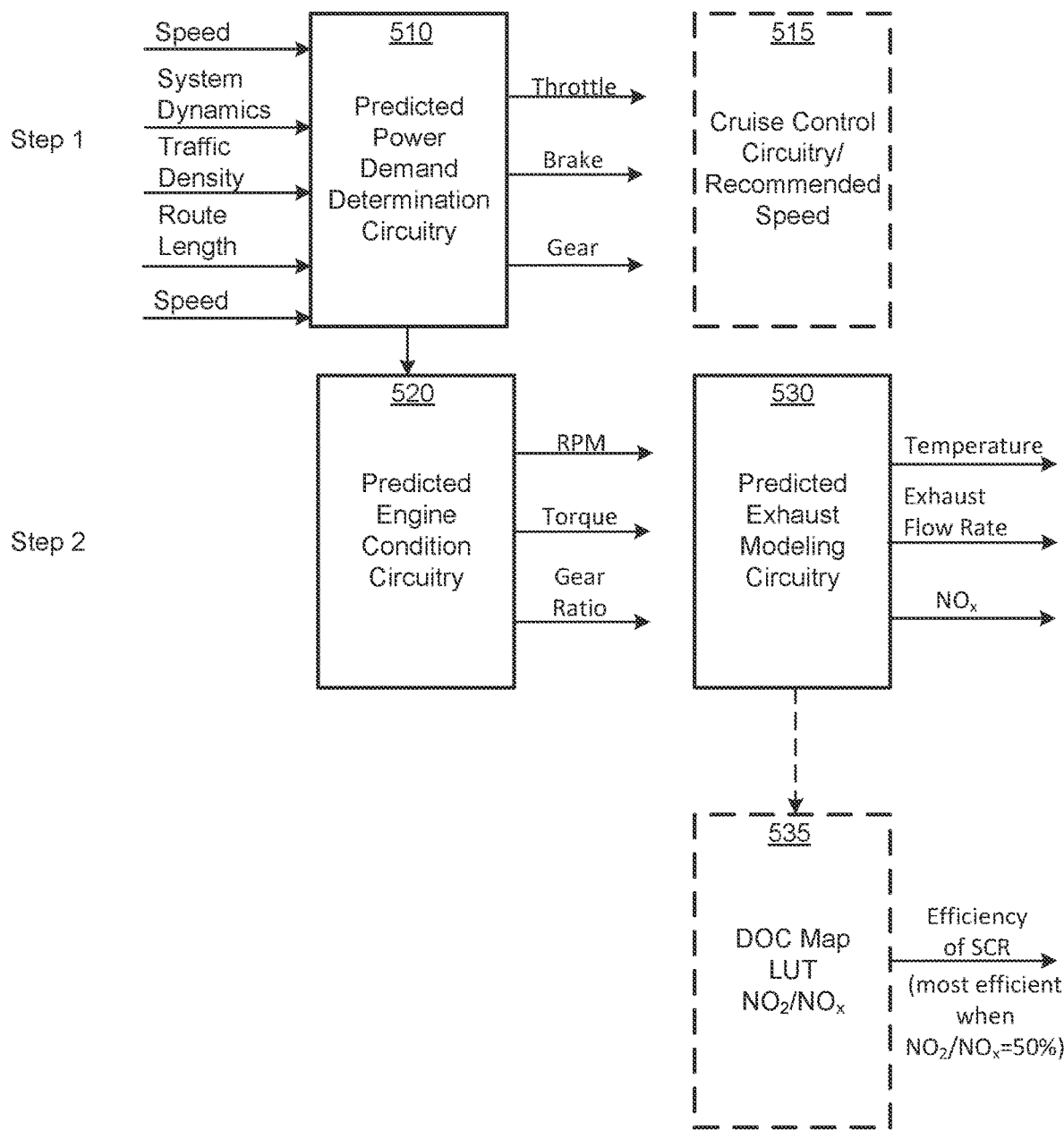
FIGS. 5A and 5B are block diagrams of the NOx reduction program in an AT system, in accordance with an embodiment of the present disclosure.
Figure 5B:
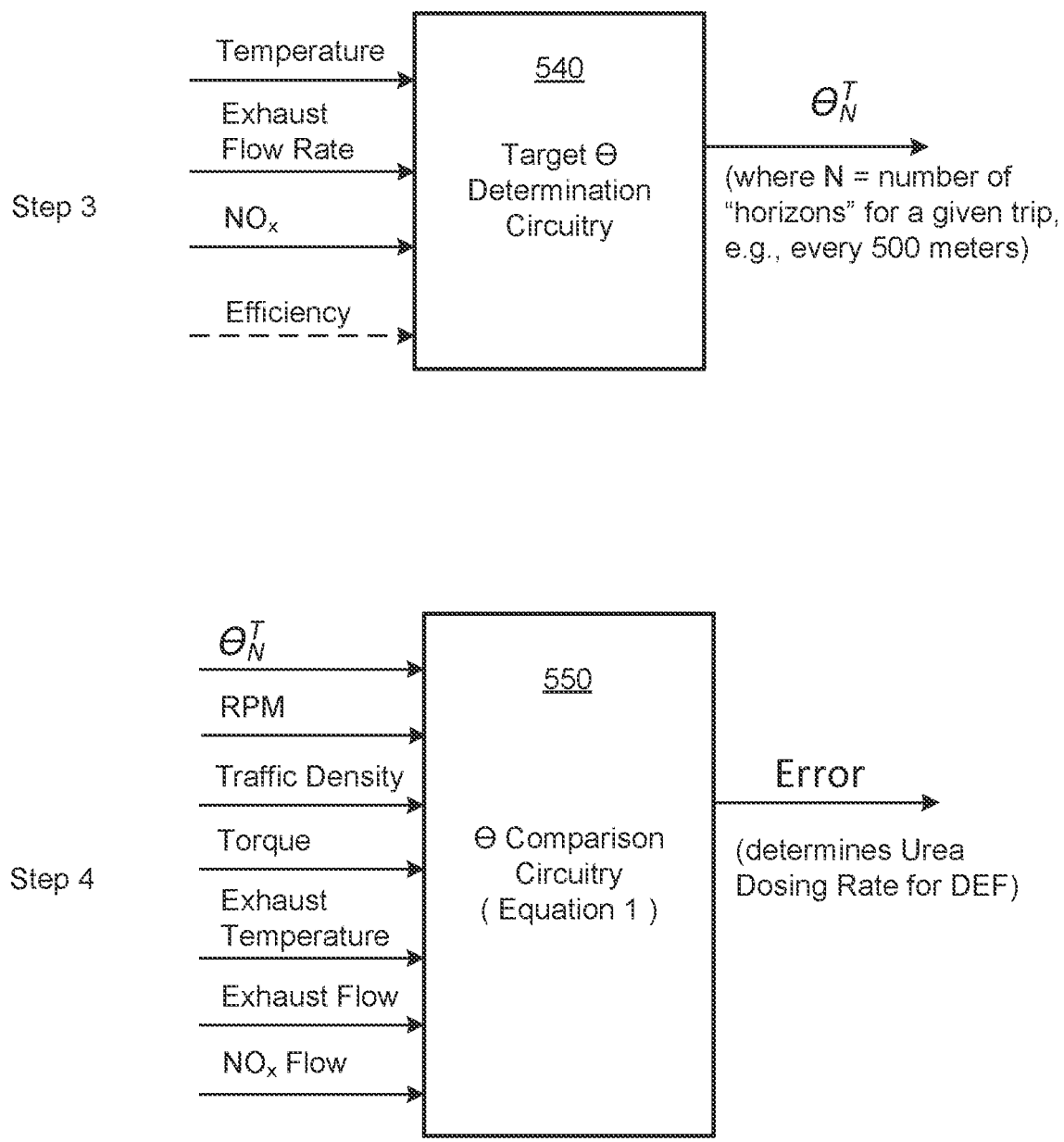

FIGS. 5A and 5B are a block diagram of the $NO_x$ reduction program 612 in an AT system, in accordance with an embodiment of the present disclosure.

Block 510 illustrates the circuitry to determine the power demand for the $NO_x$ reduction program 612 in the AT system. Block 515 illustrates optional features including interface to a cruise control system and speed recommendations display for the driver. Block 520 illustrates the circuitry to predict the engine conditions for the $NO_x$ reduction program 612 in the AT system. Block 530 illustrates the circuitry to predict the exhaust model for the $NO_x$ reduction program 612 in the AT system.

Block 535 illustrates the circuitry to determine the efficiency of the SCR at each moment in time. A look up table that approximates the NO oxidation rate of a diesel oxidation catalyst is used. This lookup table consists of temperature on the x-axis and NOx flux (i.e., NO concentration [mol]*Exhaust flow rate [kg/hr.]) on the y-axis. The look up table output is the $NO_2$/NOx ratio for the given combination of NOx flux and exhaust gas temperature.

In some embodiments the look up table may be replaced with a physics-based model of the DOC, for example, for applications that desire higher accuracy and have more computational resources to accommodate such a model.

Block 540 illustrates the circuitry to determine $\theta^T$ for the $NO_x$ reduction program 612 in the AT system. Block 550 illustrates the circuitry to compare $\theta^T$ to the actual $\theta$ for the $NO_x$ reduction program 612 in the AT system. The output of Block 550 is the error that is used to determine the urea dosing rate for the DEF.

Figure 6:
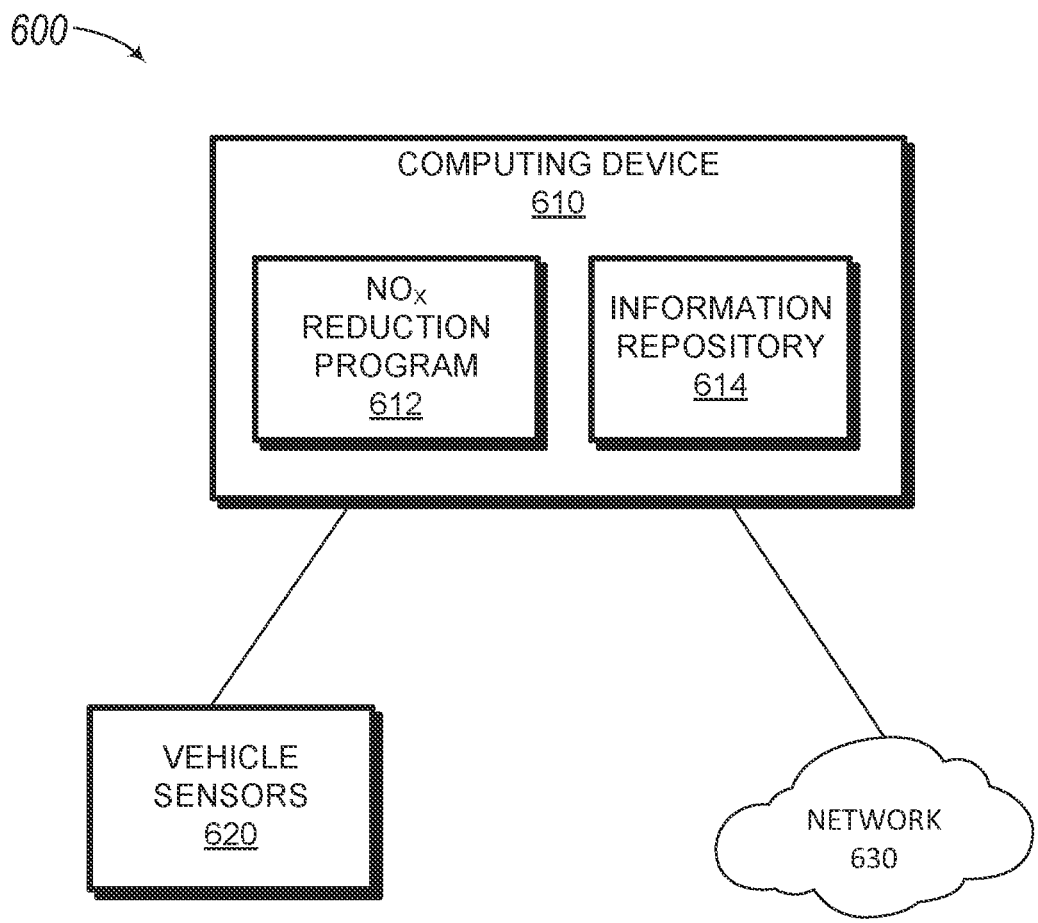
FIG. 6 is a functional block diagram illustrating a distributed data processing environment, in accordance with an embodiment of the present disclosure.

FIG. 6 is a functional block diagram illustrating a distributed data processing environment, generally designated 600, suitable for operation of the $NO_x$ reduction program 612 in accordance with at least one embodiment of the present disclosure. The term "distributed" as used herein describes a computer system that includes multiple, physically distinct devices that operate together as a single computer system.

FIG. 6 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 600 includes computing device 610 optionally connected to network 630. Network 630 can be, for example, a telecommunications network, a local area network (LAN), a wide area network (WAN), such as the Internet, a Dedicated Short-Range Communications (DSRC) radio network, a V2X communications network, or a combination of the three, and can include wired, wireless, or fiber optic connections. Network 630 can include one or more wired and/or wireless networks that are capable of receiving and transmitting data, voice, and/or video signals, including multimedia signals that include voice, data, and video information. In general, network 630 can be any combination of connections and protocols that will support communications between computing device 610 and other computing devices (not shown) within distributed data processing environment 600.

Computing device 610 can be a standalone computing device, such as a dedicated engine AT controller, an engine control computer, a mobile computing device, or any other electronic device or computing system capable of receiving, sending, and processing data. In another embodiment, computing device 610 can represent a server computing system utilizing multiple computers as a server system, such as in a cloud computing environment. In some embodiments, computing device 610 may be incorporated into the engine AT system. In other embodiments, computing device 610 may be external to the engine AT system and communicatively coupled to the engine AT system. In yet other embodiments, computing device 610 may be a plurality of separate computing devices that are communicatively coupled, e.g., through network 630.

In an embodiment, computing device 610 includes the $NO_x$ reduction program 612. In an embodiment, the $NO_x$ reduction program 612 is a program, application, or subprogram of a larger program for reduced nitrous oxide emissions using predictive urea dosing control. In an alternative embodiment, the $NO_x$ reduction program 612 may be located on any other device accessible by computing device 610 via network 630.

In an embodiment, computing device 610 includes information repository 614. In an embodiment, information repository 614 may be managed by the $NO_x$ reduction program 612. In an alternate embodiment, information repository 614 may be managed by the operating system of the computing device 610, alone, or together with, the $NO_x$ reduction program 612. Information repository 614 is a data repository that can store, gather, compare, and/or combine information. In some embodiments, information repository 614 is located externally to computing device 610 and accessed through a communication network, such as network 630. In some embodiments, information repository 614 is stored on computing device 610. In some embodiments, information repository 614 may reside on another computing device (not shown), provided that information repository 614 is accessible by computing device 610. Information repository 614 includes, but is not limited to, emissions data, vehicle speed data, trip data, system dynamics data, traffic data, elevation data, vehicle transmission data, engine exhaust model data, machine learning training data, Lookup table (LUT) data, and other data that is received by the $NO_x$ reduction program 612 from one or more sources, and data that is created by the $NO_x$ reduction program 612.

Information repository 614 may be implemented using any non-transitory volatile or non-volatile storage media for storing information, as known in the art. For example, information repository 614 may be implemented with random-access memory (RAM), semiconductor memory, solid-state drives (SSD), one or more independent hard disk drives, multiple hard disk drives in a redundant array of independent disks (RAID), or an optical disc. Similarly, information repository 614 may be implemented with any suitable storage architecture known in the art, such as a relational database, an object-oriented database, or one or more tables.

Distributed data processing environment 600 also includes vehicle sensors 620. These are various sensors on the vehicle that are used by the $NO_x$ reduction program 612. These sensors may include, but are not limited to, $NO_x$ sensors, $NH_3$ sensors, temperature sensors, etc.

Figure 7:
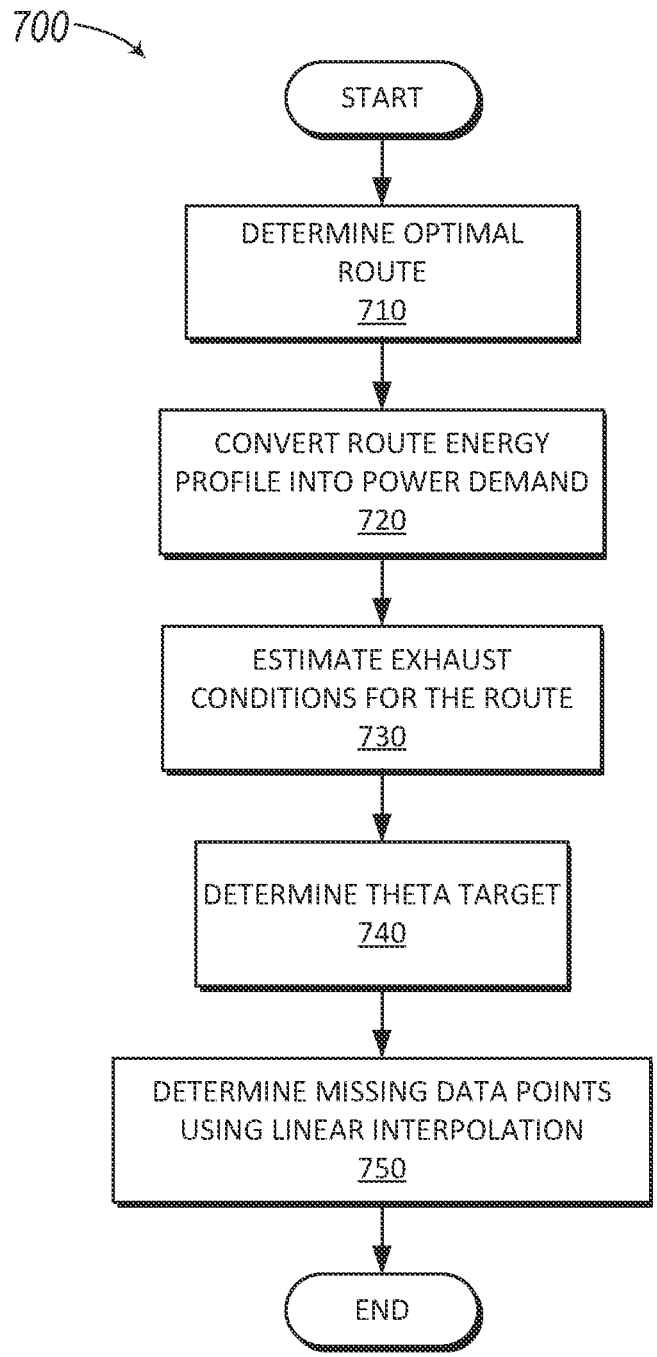
FIG. 7 is a flowchart diagram depicting operations for the section of the $NO_x$ reduction program that determines the target coverage fraction of $NH_3$ for each horizon of a trip, to reduce $NO_x$ emissions in an AT, on the distributed data processing environment of FIG. 3, in accordance with an embodiment of the present disclosure.

FIG. 7 is a flowchart diagram depicting operations for the section of the $NO_x$ reduction program 612 that determines $\theta^T$ for each horizon of a trip, to reduce $NO_x$ emissions in an AT, on the distributed data processing environment of FIG. 3, in accordance with an embodiment of the present disclosure. In an alternative embodiment, the operations of workflow 700 may be performed by any other program while working with the $NO_x$ reduction program 612.

It should be appreciated that embodiments of the present disclosure provide at least for reduced nitrous oxide emissions using predictive urea dosing control. However, FIG. 7 provides only an illustration of one implementation and does not imply any limitations with regard to the environments in which different embodiments may be implemented. Many modifications to the depicted environment may be made by those skilled in the art without departing from the scope of the disclosure as recited by the claims.

It should be appreciated that this section of the $NO_x$ reduction program 612 repeats each time a new trip is started. In addition, this section of the $NO_x$ reduction program 612 may be run while enroute, for example, if route conditions change requiring changing the route.

The $NO_x$ reduction program 612 determines the optimal route (operation 710). In the illustrated example embodiment, the $NO_x$ reduction program 612 determines a route by using eco-routing as described above. The $NO_x$ reduction program 612 then creates a route energy profile for the optimal route.

The $NO_x$ reduction program 612 converts the route energy profile into power demand (operation 720). The $NO_x$ reduction program 612 converts the route energy profile created in operation 710 into a power demand, which is a function of speed and system dynamics. System dynamics may include engine RPM, torque, transmission gear number, exhaust flow, temperature, amount of $NO_x$, and DOC map (i.e., $NO_2/NO_x$ ratio).

The $NO_x$ reduction program 612 estimates the exhaust conditions for the optimal route (operation 730). The $NO_x$ reduction program 612 uses the data determined in operation 720, including engine and DOC maps, to estimate exhaust conditions for the optimal route. The exhaust conditions may include temperature, exhaust flow rate, and amount of $NO_x$.

The $NO_x$ reduction program 612 determines $\theta^T$ (operation 740). The $NO_x$ reduction program 612 determines $\theta^T$ from the data gathered in operations 710-730, to determine $\theta_N^T$, the theta target for short horizon N. In some embodiments, the $NO_x$ reduction program 612 determines $\theta^T$ from a LUT. In other embodiments, the $NO_x$ reduction program 612 uses AI to determine $\theta^T$.

The $NO_x$ reduction program 612 determines the missing data points using linear interpolation (operation 750). When every short horizon data point is not available, then the $NO_x$ reduction program 612 uses linear interpolation to determine the missing data points. This section of the $NO_x$ reduction program 612 then ends for this cycle.

Machine learning (ML) is an application of AI that creates systems that have the ability to automatically learn and improve from experience. ML involves the development of computer programs that can access data and learn based on that data. ML algorithms typically build mathematical models based on sample, or training, data in order to make predictions or decisions without being explicitly programmed to do so. The use of training data in ML requires human intervention for feature extraction in creating the training data set. The two main types of ML are Supervised learning and Unsupervised learning. Supervised learning uses labeled datasets that are designed to train or "supervise" algorithms into classifying data or predicting outcomes accurately. Supervised learning is typically used for problems requiring classification or regression analysis. Classification problems use an algorithm to accurately assign test data into specific categories. Regression is a method that uses an algorithm to understand the relationship between dependent and independent variables. Regression models are helpful for predicting numerical values based on different data points.

Unsupervised learning uses machine learning algorithms to analyze and cluster unlabeled datasets. These algorithms discover hidden patterns or data groupings without the need for human intervention, and their ability to discover similarities and differences in information make unsupervised learning the ideal solution for exploratory data analysis, cross-selling strategies, customer segmentation, and image recognition. Unsupervised learning is typically used for problems requiring clustering, e.g., K-means clustering, or association, which uses different rules to find relationships between variables in a given dataset.

Deep learning is a sub-field of ML that automates much of the feature extraction, eliminating some of the manual human intervention required and enabling the use of larger data sets. Deep learning typically uses neural networks, which are highly interconnected entities, called nodes. Each node, or artificial neuron, connects to another and has an associated weight and threshold. A node multiplies the input data with the weight, which either amplifies or dampens that input, thereby assigning significance to inputs with regard to the task the algorithm is trying to learn. If the output of any individual node is above the specified threshold value, that node is activated, sending data to the next layer of the network. Otherwise, no data is passed along to the next layer of the network. A neural network that consists of more than three layers can be considered a deep learning algorithm or a deep neural network.

In some embodiments, the operations of FIG. 7 above may be performed using AI. In one exemplary embodiment, operations 710-730 may be performed using ML. In another exemplary embodiment, operations 710-730 may be performed using a neural network. For example, in operation 730, the engine exhaust conditions are estimated for the route. In this embodiment, the input conditions used by the $NO_x$ reduction program 612 may be assigned as the weights, or coefficients, of the nodes of the neural network. These input conditions may include, but are not limited to, vehicle speed, traffic density, route length, elevation, temperature, exhaust flow rate, amount of $NO_x$, engine RPM, torque, and gear ratio.

In some embodiments that use AI, an additional operation may be added to the flow diagram of FIG. 7 to train the model used by the AI engine. In addition, an operation may be added to the flow diagram of FIG. 7 to feed back any new data, for example, by changing conditions in the in-route data determined in FIG. 8 below, into the AI model to continually update the model.

Figure 8:
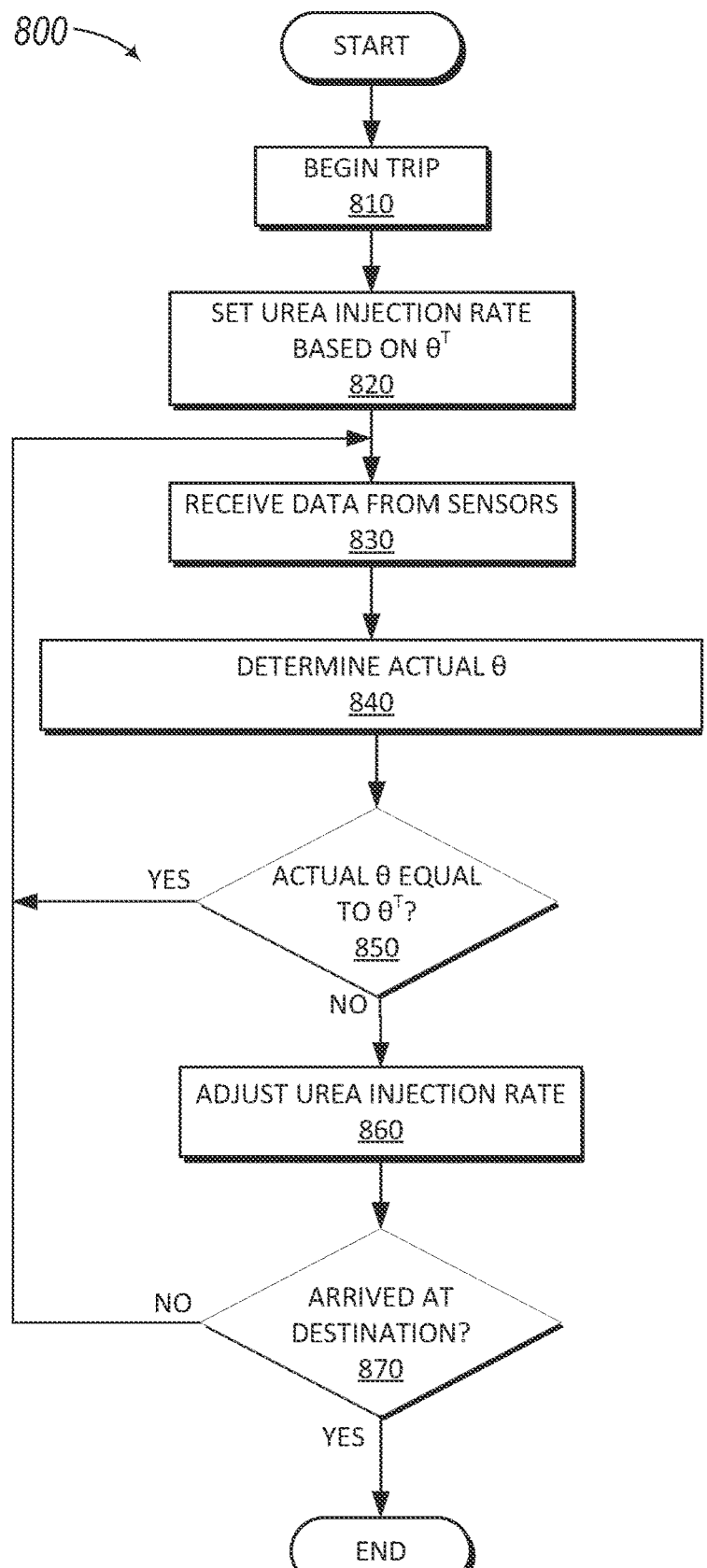
FIG. 8 is a flowchart diagram depicting operations for the section of the $NO_x$ reduction program that compares the actual coverage fraction of $NH_3$ to the target coverage fraction of $NH_3$ and adjusts urea injection accordingly to reduce $NO_x$ emissions in an AT, on the distributed data processing environment of FIG. 3, in accordance with an embodiment of the present disclosure.

FIG. 8 is a flowchart diagram depicting operations for the section of the $NO_x$ reduction program 612 that compares the actual $\theta$ to the target $\theta^T$ and adjusts urea injection accordingly to reduce $NO_x$ emissions in an AT, on the distributed data processing environment of FIG. 3, in accordance with an embodiment of the present disclosure. In an alternative embodiment, the operations of workflow 800 may be performed by any other program while working with $NO_x$ reduction program 612.

It should be appreciated that embodiments of the present disclosure provide at least for reduced nitrous oxide emissions using predictive urea dosing control. However, FIG. 8 provides only an illustration of one implementation and does not imply any limitations with regard to the environments in which different embodiments may be implemented. Many modifications to the depicted environment may be made by those skilled in the art without departing from the scope of the disclosure as recited by the claims.

The $NO_x$ reduction program 612 begins the trip (operation 810). In the illustrated example embodiment, the $NO_x$ reduction program 612 begins the trip that was optimally routed in FIG. 7 above.

The $NO_x$ reduction program 612 sets the urea injection rate (operation 820). The $NO_x$ reduction program 612 sets the urea injection rate based on et, the theta target for the current short horizon (N) as determined in FIG. 7 above.

The $NO_x$ reduction program 612 receives data from the sensors (operation 830). The $NO_x$ reduction program 612 receives data from the various sensors on the vehicle. These sensors may include, but are not limited to, temperature sensors, $NO_x$ sensors, $NH_3$ sensors, etc. In addition to the data received from the various sensors, the $NO_x$ reduction program 612 may receive real-time data from the V2X communications network and combine the data from the various sensors to the real-time data received from the V2X communications network.

The $NO_x$ reduction program 612 determines the actual $\theta$ (operation 840). The $NO_x$ reduction program 612 uses the data received from the various sensors in operation 820 to determine the actual $\theta$, e.g., by using a LUT, for the current short horizon.

The $NO_x$ reduction program 612 determines if the actual $\theta$ is equal to $\theta^T$ for the current short duration (decision block 850). The $NO_x$ reduction program 612 determines if the actual $\theta$ determined in operation 840 is equal to OT, the theta target for the current short horizon. For typical operation, the values of $\theta$ and $\theta_N^T$ may be divergent since reaching intended target $\theta$ in an SCR requires significant amount of steady state operation that may not be encountered in real world driving conditions. Therefore, the value of $\theta$ is considered equal to $\theta_N^T$ if it is within a predetermined range of the target theta for a typical device. This value, however, is dependent on the design of a particular catalyst and may change based on type of SCR and its application. In one example catalyst design the value of $\theta$ is considered equal to $\theta_N^T$ if $\theta$ is within +/−15% of $\theta_N^T$.

If the actual $\theta$ determined in operation 840 is equal to $\theta_N^T$, then the predicted urea injection rate will minimize the $NO_x$ emissions. Therefore, if the $NO_x$ reduction program 612 determines that the actual $\theta$ determined in operation 840 is equal to $\theta_N^T$ ("yes" branch, decision block 850), then the $NO_x$ reduction program 612 returns to operation 830 to continue to monitor the actual data from the sensors. If the $NO_x$ reduction program 612 determines that the actual $\theta$ determined in operation 840 is not equal to $\theta_N^T$ ("no" branch, decision block 850), then conditions may have varied, and the predicted urea injection rate may not minimize the $NO_x$ emissions. Therefore, the $NO_x$ reduction program 612 proceeds to operation 860 to adjust the urea injection rate.

The $NO_x$ reduction program 612 adjusts the urea injection rate (operation 860). Since the $NO_x$ reduction program 612 determined in decision block 850 that conditions may have varied, and the predicted urea injection rate may not minimize the $NO_x$ emissions, so the $NO_x$ reduction program 612 will determine a revised urea injection rate to compensate for the changed conditions and will adjust the urea injection rate accordingly.

The $NO_x$ reduction program 612 determines if the vehicle has arrived at the destination (decision block 870). The $NO_x$ reduction program 612 determines if the vehicle has reached the destination as determined from the route data determined in operation 710 of FIG. 7 above. If the $NO_x$ reduction program 612 determines that the vehicle has reached the destination ("yes" branch, decision block 870), then the $NO_x$ reduction program 612 ends for this cycle. If the $NO_x$ reduction program 612 determines that the vehicle has not reached the destination ("no" branch, decision block 870), then the $NO_x$ reduction program 612 returns to operation 820 to receive the next data from the sensors.

Figure 9:
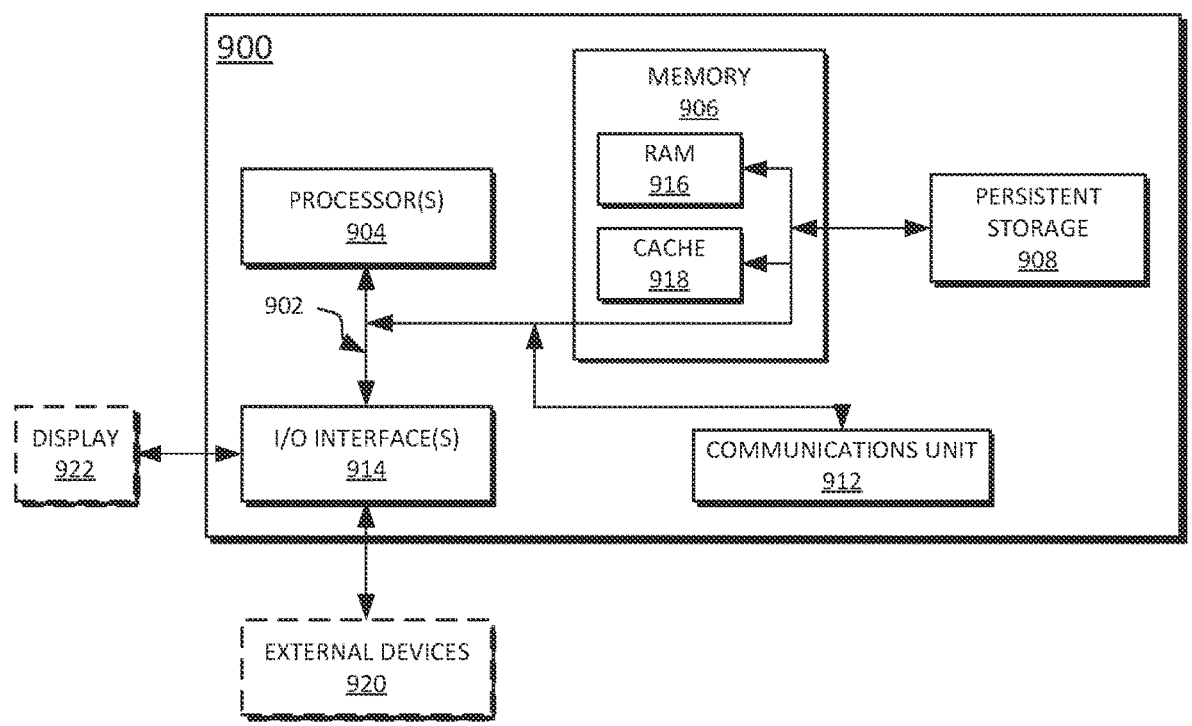
FIG. 9 depicts a block diagram of components of the computing device executing the $NO_x$ reduction program within the distributed data processing environment of FIG. 3, in accordance with an embodiment of the present disclosure.

FIG. 9 is a block diagram depicting components of one example computer 900 of the computing device 610 suitable for the $NO_x$ reduction program 612, in accordance with at least one embodiment of the disclosure. FIG. 9 displays the computing device or computer 900, one or more processor(s) 904 (including one or more computer processors), a communications fabric 902, a memory 906 including, a random-access memory (RAM) 916 and a cache 918, a persistent storage 908, a communications unit 912, I/O interfaces 914, a display 922, and external devices 920. It should be appreciated that FIG. 9 provides only an illustration of one embodiment and does not imply any limitations with regard to the environments in which different embodiments may be implemented. Many modifications to the depicted environment may be made.

As depicted, the computer 900 operates over the communications fabric 902, which provides communications between the processor(s) 904, memory 906, persistent storage 908, communications unit 912, and input/output (I/O) interface(s) 914. The communications fabric 902 may be implemented with an architecture suitable for passing data or control information between the processors 904 (e.g., microprocessors, communications processors, and network processors), the memory 906, the external devices 920, and any other hardware components within a system. For example, the communications fabric 902 may be implemented with one or more buses.

The memory 906 and persistent storage 908 are non-transitory computer readable storage media. In the depicted embodiment, the memory 906 comprises a RAM 916 and a cache 918. In general, the memory 906 can include any suitable volatile or non-volatile non-transitory computer readable storage media. Cache 918 is a fast memory that enhances the performance of processor(s) 904 by holding recently accessed data, and near recently accessed data, from RAM 916.

Program instructions for the $NO_x$ reduction program 612 may be stored in the persistent storage 908, or more generally, any non-transitory computer readable storage media, for execution by one or more of the respective processors 904 via one or more memories of the memory 906. The persistent storage 908 may be a magnetic hard disk drive, a solid-state disk drive, a semiconductor storage device, flash memory, read only memory (ROM), electronically erasable programmable read-only memory (EEPROM), or any other non-transitory computer readable storage media that is capable of storing program instruction or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

The communications unit 912, in these examples, provides for communications with other data processing systems or devices. In these examples, the communications unit 912 includes one or more network interface cards. The communications unit 912 may provide communications through the use of either or both physical and wireless communications links. In the context of some embodiments of the present disclosure, the source of the various input data may be physically remote to the computer 900 such that the input data may be received, and the output similarly transmitted via the communications unit 912.

The I/O interface(s) 914 allows for input and output of data with other devices that may be connected to computer 900. For example, the I/O interface(s) 914 may provide a connection to external device(s) 920 such as a keyboard, a keypad, a touch screen, a microphone, a digital camera, and/or some other suitable input device. External device(s) 920 can also include portable non-transitory computer readable storage media such as, for example, thumb drives, portable optical or magnetic disks, and memory cards. Software and data used to practice embodiments of the present disclosure, e.g., the $NO_x$ reduction program 612, can be stored on such portable non-transitory computer readable storage media and can be loaded onto persistent storage 908 via the I/O interface(s) 914. I/O interface(s) 914 also connect to a display 922.

Display 922 provides a mechanism to display data to a user and may be, for example, a computer monitor. Display 922 can also function as a touchscreen, such as a display of a tablet computer.

According to one aspect of the present disclosure, there is thus provided a system for reducing nitrous oxide emissions in an aftertreatment system. The system includes: one or more computer processors; one or more non-transitory computer readable storage media; and program instructions stored on the one or more non-transitory computer readable storage media for execution by at least one of the one or more computer processors. The stored program instructions including instructions to: determine a route; determine a set of target coverage fractions of ammonia over a set of steps for the optimal route, wherein the coverage fraction of ammonia is a ratio of stored ammonia to a maximum storage capacity of ammonia in an SCR; determine an actual coverage fraction of ammonia for each step of the set of steps for the optimal route; compare the actual coverage fraction of ammonia to the target coverage fraction of ammonia for each step; calculate a cost function for each step of the optimal route; and adjust the urea injection rate based on the cost function.

According to another aspect of the disclosure, there is provided a computer-implemented method for reducing nitrous oxide emissions in an aftertreatment system. The computer-implemented method includes: determining, by one or more computer processors, a route; determining, by the one or more computer processors, a set of target coverage fractions of ammonia over a set of steps for the optimal route; determining, by the one or more computer processors, an actual coverage fraction of ammonia for each step of the set of steps for the optimal route; comparing, by the one or more computer processors, the actual coverage fraction of ammonia to the target coverage fraction of ammonia for each step; calculating, by the one or more computer processors, a cost function for each step of the optimal route; and adjusting, by the one or more computer processors, the urea injection rate based on the cost function.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed:

1. A system for reducing nitrous oxide ($NO_x$) emissions in an aftertreatment system of a vehicle, the system comprising:
    one or more computer processors;
    one or more computer readable storage media; and
    program instructions stored on the one or more computer readable storage media for execution by at least one of the one or more computer processors, the stored program instructions including instructions to:
    determine a route for a trip for the vehicle;
    determine a predicted power demand for the vehicle, for each step of a set of steps for the route, based on the determined route, predicted traffic density and predicted vehicle speed;
    determine predicted vehicle dynamics that includes engine speed in revolutions per minute (RPM), torque and gear number for each step in the set of steps for the route based on the predicted power demand;
    determine predicted exhaust flow rate, temperature, and NOx concentration for each step in the set of steps for the route based on the predicted vehicle dynamics;
    determine, for each step in the set of steps for the route, predicted inlet conditions for a selective catalytic reduction (SCR) device associated with the aftertreatment system of the vehicle; the predicted inlet conditions includes a predicted NO2/NOx ratio, the predicted exhaust temperature, and the predicted exhaust flow rate;
    determine a target coverage fraction of ammonia in the SCR for each step of a set of steps for the route, based on a predicted NOx flux and exhaust temperature;
    wherein the target coverage fraction of ammonia is determined prior to a start of the trip;
    determine, during operation of the vehicle along the route, an actual coverage fraction of ammonia in the catalyst for each step of the set of steps for the route;
    compare the actual coverage fraction of ammonia to the target coverage fraction of ammonia for each step of the set of steps;
    determine a cost function based on maximizing an $NO_x$ conversion, reducing a consumption of urea, and maximizing a light-off SCR device for proper operation of a catalyzed particulate filter (CPF); wherein the cost function is determined according to:

$$J = \left\{ \sum_{i=1}^{i=nu} \|\theta_{Target,Final} - \theta_{1,k+i}\|_2^2 + \lambda \sum_{i=0}^{i=nu-1} \|\Delta C_{NH_3,k+i}\|_2^2 + \lambda_2 \sum_{i=0}^{i=nu-1} \|\Delta C_{NO_x,i,SCR\_in} - \Delta C_{NO_x,i,SCR\_out}\|_2^2 \right\}$$

wherein $$\sum_{i=1}^{i=nu} \|\theta_{Target,Final} - \theta_{1,k+i}\|_2^2$$

is a control horizon cost, $$\lambda \sum_{i=0}^{i=nu-1} \|\Delta C_{NH_3,k+i}\|_2^2$$

is a urea injection rate cost, and $$+\lambda_2 \sum_{i=0}^{i=nu-1} \|\Delta C_{NO_x,i,SCR\_in} - \Delta C_{NO_x,i,SCR\_out}\|_2^2$$

is an $NO_x$ maximizing cost at the CPF inlet; and
    adjust a urea injection rate based on the determined cost function.

2. The system of claim 1, wherein each of the steps is determined based on a range of a Vehicle to Everything (V2X) communications network.

3. The system of claim 2, wherein determine the actual coverage fraction of ammonia for each step of the set of steps for the route further comprises one or more of the following program instructions, stored on the one or more computer readable storage media, to:
    receive real-time data from a Vehicle to Everything (V2X) communications network; and
    combine the real-time data from the V2X communications network with the set of data from one or more sensors.

4. The system of claim 1, wherein the route is determined using eco-routing, wherein eco-routing is an identification of a most energy-efficient route for a vehicle to travel between two points.

5. The system of claim 1, wherein artificial intelligence (AI) is used to determine the target coverage fraction of ammonia for each step of the set of steps for the route.

6. The system of claim 5, wherein a neural network is used to determine the target coverage fraction of ammonia for each step of the set of steps for the route, and further wherein weights for the neural network include at least one of a vehicle speed, a traffic density, a route length, an elevation, a temperature, an exhaust flow rate, an amount of $NO_x$, an engine RPM, a torque, and a gear ratio.

7. A tangible storage device that includes machine-readable instructions that, when executed by one or more processors, cause the one or more processors to perform operations for reducing nitrous oxide ($NO_x$) emissions in an aftertreatment system, the operations comprising:
   determine a route for a trip for the vehicle;
   determine a predicted power demand for the vehicle, for each step of a set of steps for the route, based on the determined route, predicted traffic density and predicted vehicle speed;
   determine predicted vehicle dynamics that includes engine speed in revolutions per minute (RPM), torque and gear number for each step in the set of steps for the route based on, at least in part, the predicted power demand;
   determine predicted exhaust flow rate, temperature, and NOx concentration for each step in the set of steps for the route based on the predicted vehicle dynamics;
   determine, for each step in the set of steps for the route, predicted inlet conditions for a selective catalytic reduction (SCR) device associated with the aftertreatment system of the vehicle; the predicted inlet conditions includes a predicted NO2/NOx ratio, the predicted exhaust temperature, and the predicted exhaust flow rate;
   determine a target coverage fraction of ammonia in the SCR for each step of a set of steps for the route, based on a predicted NOx flux and exhaust temperature; wherein the target coverage fraction of ammonia is determined prior to a start of the trip;
   determine, during operation of the vehicle along the route, an actual coverage fraction of ammonia in the SCR for each step of the set of steps for the route;
   compare the actual coverage fraction of ammonia to the target coverage fraction of ammonia for each step of the set of steps;
   determine a cost function based on maximizing an $NO_x$ conversion, reducing a consumption of urea, and maximizing a light-off SCR device for proper operation of a catalyzed particulate filter (CPF); wherein the cost function is determined according to:

$$J = \left\{ \sum_{i=1}^{i=nu} \|\theta_{Target,Final} - \theta_{1,k+i}\|_2^2 + \lambda \sum_{i=0}^{i=nu-1} \|\Delta C_{NH_3,k+i}\|_2^2 + \lambda_2 \sum_{i=0}^{i=nu-1} \|\Delta C_{NO_x,i,SCR\_in} - \Delta C_{NO_x,i,SCR\_out}\|_2^2 \right\}$$

wherein $$\sum_{i=1}^{i=nu} \|\theta_{Target,Final} - \theta_{1,k+i}\|_2^2$$

is a control horizon cost, $$\lambda \sum_{i=0}^{i=nu-1} \|\Delta C_{NH_3,k+i}\|_2^2$$

is a urea injection rate cost, and $$+\lambda_2 \sum_{i=0}^{i=nu-1} \|\Delta C_{NO_x,i,SCR\_in} - \Delta C_{NO_x,i,SCR\_out}\|_2^2$$

is an $NO_x$ maximizing cost at the CPF inlet; and
   adjust a urea injection rate based on the determined cost function.

8. The tangible storage device of claim 7, wherein the machine-readable instructions for comparing the actual coverage fraction of ammonia to the target coverage fraction of ammonia for each step cause the one or more processors to perform further operations comprising:
   receive a set of data from one or more sensors;
   determine the actual coverage fraction of ammonia for each step of the set of steps;
   determine whether the actual coverage fraction of NH3 equals the target coverage fraction of $NH_3$ for each step of the set of steps; and
   responsive to determining that the actual coverage fraction of ammonia does not equal the target coverage fraction of ammonia for each step of the set of steps adjust the urea injection rate.

9. The tangible storage device of claim 8, wherein the machine-readable instructions for receiving a set of data from the one or more sensors cause the one or more processors to perform further operations comprising:
   receive real-time data from a Vehicle to Everything (V2X) communications network; and
   combine the real-time data from the V2X communications network with the set of data from the one or more sensors.

10. The tangible storage device of claim 7, wherein artificial intelligence is used to determine the target coverage fraction of ammonia for each step of the set of steps for the route.

11. The tangible storage device of claim 10, wherein the artificial intelligence uses a neural network.

12. The tangible storage device of claim 11, wherein weights for the neural network include at least one of a vehicle speed, a traffic density, a route length, an elevation, a temperature, an exhaust flow rate, an amount of $NO_x$, an engine RPM, a torque, and a gear ratio.

13. The tangible storage device of claim 7, wherein the machine-readable instructions cause the one or more processors to perform further operations comprising:
   determine a predicted trip end time from the route; and
   cause a dosing of an excess urea, wherein the excess urea is dosed to ensure an optimal coverage fraction of ammonia for a second start of a next trip.

* * * * *